US006973026B1

(12) United States Patent
Dyrga et al.

(10) Patent No.: US 6,973,026 B1
(45) Date of Patent: Dec. 6, 2005

(54) RESILIENT CHASSIS-BASED NETWORK SWITCHING

(75) Inventors: Ryszard W. Dyrga, Gdansk (PL); Andrzej K. Matejko, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 09/608,773

(22) Filed: Jun. 30, 2000

(51) Int. Cl.$^7$ .......................... H04L 12/26; H04L 12/56
(52) U.S. Cl. ..................... 370/218; 370/242; 370/390; 370/401; 370/419
(58) Field of Search ................................ 370/216–220, 370/351–353, 355–358, 389–390, 392, 395.1–395.2, 370/401, 409, 419, 464, 466, 242

(56) References Cited

U.S. PATENT DOCUMENTS

| | | | | |
|---|---|---|---|---|
| 5,481,673 A | * | 1/1996 | Michelson | 370/351 |
| 5,485,453 A | * | 1/1996 | Wahlman et al. | 370/389 |
| 5,802,047 A | * | 9/1998 | Kinoshita | 370/359 |
| 5,909,427 A | * | 6/1999 | Manning et al. | 370/219 |
| 5,953,314 A | * | 9/1999 | Ganmukhi et al. | 370/220 |
| 6,147,996 A | * | 11/2000 | Laor et al. | 370/394 |
| 6,263,415 B1 | * | 7/2001 | Venkitakrishnan | 370/406 |
| 6,442,135 B1 | * | 8/2002 | Ofek | 370/229 |
| 6,473,421 B1 | * | 10/2002 | Tappan | 370/351 |
| 6,661,790 B1 | * | 12/2003 | Nolan et al. | 370/392 |

OTHER PUBLICATIONS

Jo K.Y., et al., "Design and Analysis of Multiprotocol Networks With IP Routers," Military Communications in a Changing World, Nov. 1991, pp. 193-197.

* cited by examiner

*Primary Examiner*—Hassan Kizou
*Assistant Examiner*—Ahmed Elallam
(74) *Attorney, Agent, or Firm*—Blakely, Sokoloff, Taylor & Zafman LLP

(57) ABSTRACT

A resilient chassis-based network switch includes redundant control units connected to a network interface through an additional logical interface. The network interface includes multiple data communication ports to transmit data to and receive data from a variety of devices connected to the switch through one or more networks. When coupled to the network interface through the logical interface, each control unit may be viewed as an independent logical switch equipped to transmit and receive data through any of communication ports regardless of the operating state of the other control unit(s).

18 Claims, 6 Drawing Sheets

RESILIENT CHASSIS-BASED NETWORK SWITCHING

BACKGROUND OF THE INVENTION

1. Field of the Invention

The present invention generally relates to data communications. More specifically, the present invention relates to resilient chassis-based network switching.

2. Background Information

The Internet is a worldwide system of computer networks, whereby users at any one computer or device connected to the Internet, can communicate with any other computer or device similarly connected to the Internet. In recent years, the Internet has experienced remarkable growth. As the number of networked computers and appliances comprising the Internet has increased, so too has the amount of data transmitted over the Internet by these devices. When data is transmitted over the Internet from one device to another, it is not uncommon for the data to follow a path that traverses multiple countries or even continents. During its journey, the data may pass or be routed through a number of switching devices which assist the data in reaching its final destination. These switching devices, also known as network switches and/or routers, direct the data to its designated destination based upon address information attached to, or inserted within the data.

As an increasing number of time-sensitive and even real-time data transmissions are being transmitted over networks such as the Internet, a greater emphasis is being placed upon the timely delivery of data. If, for example, data packets are delayed during a "live" audio and/or video transmission delivered over a network, the quality of the audio and/or video may suffer as the audio and/or video may appear segmented or jittery. Accordingly, attention has focused on how to keep network data transmissions from being delayed in the delivery process.

One cause of network data delay may be attributed to slow or inoperative network switching devices. Currently, if a switching device, whether it be a router or a switch, were to cease operating or fail, the data that was originally designated to pass through the failed switch would have to be re-routed through another switching device in order for the data to progress to its final destination. Such a re-routing can cause significant delay in the data transmission resulting in a noticeable degradation in transmission quality.

Network switches and routers can be implemented in both hardware and software and may vary with respect to their physical appearance. Software based switches may be implemented on a number of processing platforms known in art, whereas hardware implemented switches are often embodied within what is referred to as a chassis. Within a switch chassis there typically exists multiple circuit boards known as "blades." According to switches known in the art and described below with respect to FIGS. 1A and 1B, if one of the blades within the switch should fail, data throughput may suffer.

FIG. 1A illustrates a first chassis-based switch configuration according to the prior art. Switch 100 includes chassis 102, control blade 104, and network interface blades 105 and 106 including multiple data ports 108. Data ports 108 receive data from one or more devices coupled to switch 100 through one or more networks, such as the Internet, and pass the data through signal lines 112 to control unit 110 located on control blade 104. Control unit 110 then redirects the data through signal lines 112 to any of the data ports 108. Unfortunately, however, the switch configuration shown in FIG. 1A is susceptible to a single point of failure. For example, if control blade 104 or control unit 110 were to fail, switch 100 would likewise fail causing delays in data transmission until such time that switch 100 could be repaired.

FIG. 1B illustrates a second chassis-based switch configuration known in the prior art to address some of the limitations of the first chassis-based switch configuration shown in FIG. 1A. Switch 150 includes chassis 152, control blade 154 and control blade 164. Each of control blades 154 and 164 includes a control unit and a network interface comprising multiple data ports. Control blade 154 includes control unit 155, which is coupled to data ports 158 through signal lines 156. Likewise, control blade 164 includes control unit 160, which is coupled to data ports 168 through signal lines 161. In this example, control unit 155 switches data between data ports 158, whereas control unit 160 switches data between data ports 168. Although this switch configuration addresses the single point of failure problem by including dual control units, each control unit within the switch is nonetheless limited to switching between only a subset of all communication ports within the switch. For example, if control unit 155 or control blade 154 were to fail and control unit 160 remained operational, data would continue to be switched between data ports 168, but would not be switched between data ports 158. Similarly, if control unit 160 or control blade 164 were to fail and control unit 155 remained operational, data would continue to be switched between data ports 158, but would not be switched between data ports 168.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A resilient chassis-based network switch including redundant control units is disclosed. The switch may be specially constructed for the described purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions. Various general purpose machines may be used with programs in accordance with the teachings herein, or it may prove convenient to construct more specialized apparatus to perform the required functions as will become apparent from the description below.

Although all or some of the functions described herein may be performed by digital logic and/or circuitry including an integrated circuit or other semiconductor substrates, some or all of these functions may be performed by software executing on one or more processing devices on a computer system or specialized apparatus. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In one embodiment, the resilient chassis-based switch described herein includes at least two control units connected to a physical network interface through a logical network interface. The physical network interface includes multiple data communication ports to transmit data to, and receive data from a variety of devices connected to the switch via one or more external networks. When coupled to the physical network interface by way of the logical network interface, each control unit may be viewed as an independent logical switch equipped to transmit and receive data through any of the data communication ports within the switch regardless of the operating state of the other control unit(s).

Figure 1A:
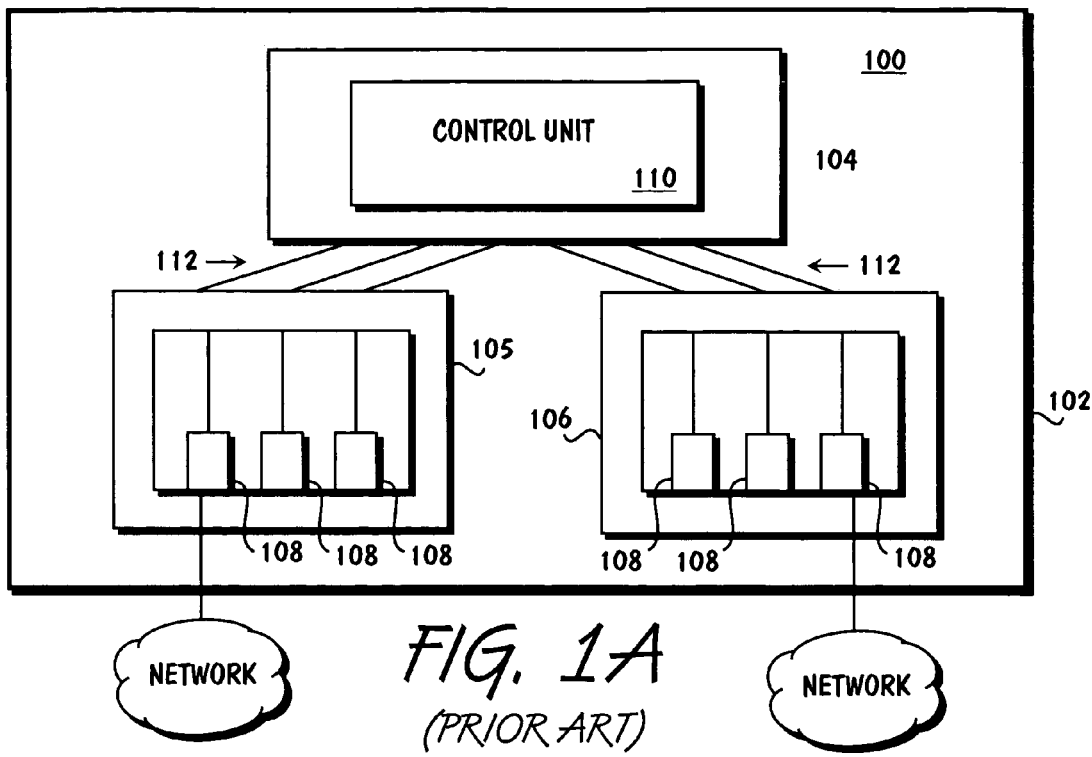
FIG. 1A illustrates a first chassis-based switch configuration according to the prior art.
Figure 1B:
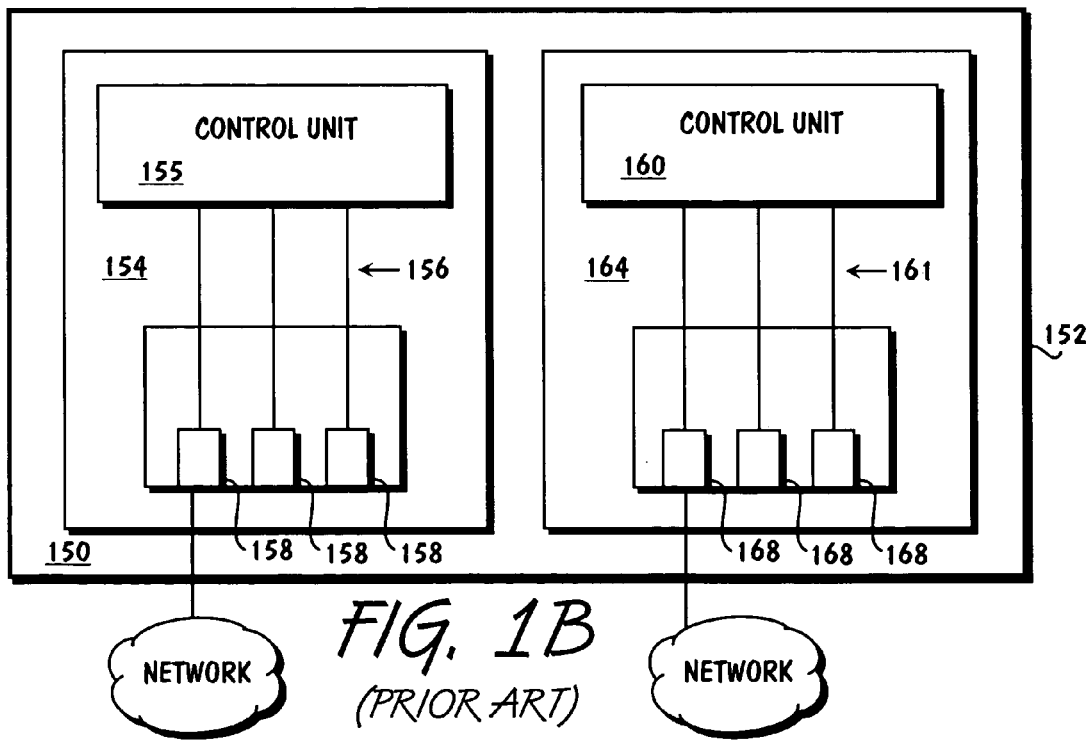
FIG. 1B illustrates a second chassis-based switch configuration according to the prior art.
Figure 2A:
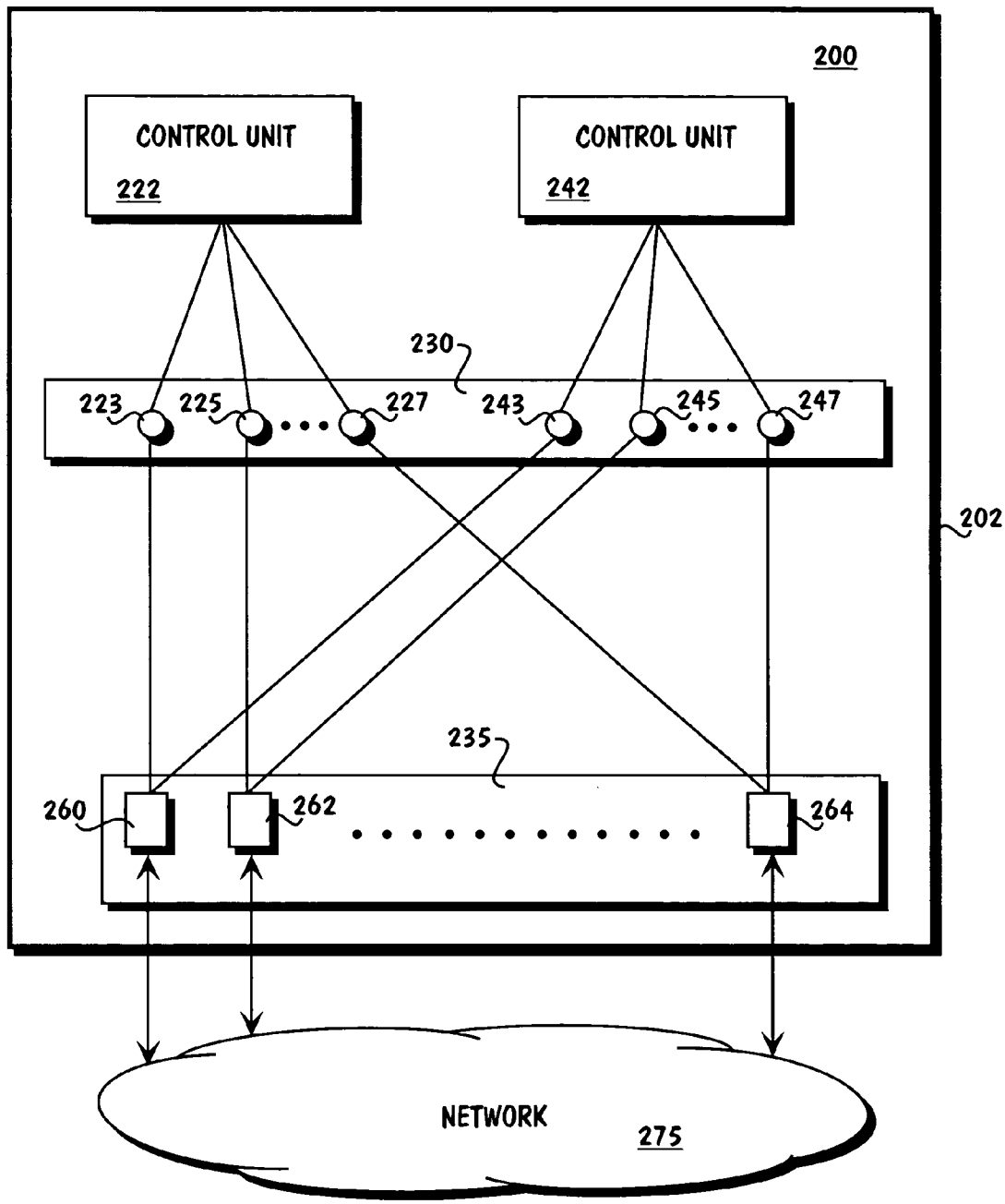
FIG. 2A is a block diagram illustrating a chassis-based switch according to one embodiment of the invention.

FIG. 2A is a block diagram illustrating a chassis-based switch according to one embodiment of the invention. Switch 200 includes chassis 202, control units 222 and 242, logical network interface 230, and physical network interface 235. Chassis 202 is equipped to encase a number of electronic and mechanical devices for switching and/or processing network data. In one embodiment of the invention, chassis 202 is equipped to secure a number of circuit boards or blades such that any one of the blades within chassis 200 may transmit signals to, and receive signals from any other of the blades within chassis 200. For the purpose of this discussion, two or more electronic circuits capable of exchanging electronic signals and/or formatted data messages are considered to be communicatively coupled even if they may not be coupled directly together. Thus, chassis 200 is equipped to encase multiple blades communicatively coupled to one another.

Switch 200 further includes physical network interface 235, which represents a data communication interface between switch 200 and network 275. Network 275 represents one or more networks of interconnected computers and/or devices through which data may be exchanged. Physical network interface 235 further includes physical communication ports 260, 262 and 264 as shown. Physical communication ports 260, 262 and 264 represent ports known in the art to couple a chassis-based switch, such as switch 200, to a wide variety of networks. Switch 200 may be coupled to network 275 through one or more wireline or wireless communication couplings known in the art. In one embodiment, physical communication ports 260, 262 and 264 are embodied within one or more blades secured within chassis 202.

Switch 200 also includes control units 222 and 242. Control units 222 and 242 each represent circuitry to switch and/or route data received from network 275 through one of physical communication ports 260, 262 and 264 back out to network 275 through the same or a different one of physical communication ports 260, 262 and 264. In one embodiment, at least one of control units 222 and 242 includes a processor to execute code that when executed, causes the respective control unit(s) to switch and/or route the received data accordingly. Control units 222 and 242 are further discussed below with respect to FIG. 3.

Switch 200 additionally includes logical network interface 230. Logical network interface 230 represents multiple logical communication ports (e.g., 223, 225, 227, 243, 245 and 247) communicatively coupled between physical network interface 235 and control units 222 and 242. Logical network interface 230 is communicatively coupled to each physical communication port within physical network interface 235 by at least one signal line as shown. In one embodiment of the invention, logical network interface 230 is communicatively coupled to each physical communication port within physical network interface 235 by two signal lines.

The term "logical" is used herein to refer to a level of abstraction that provides each control unit, for example, with the ability to simultaneously address each of physical communication ports 260, 262 and 264. CPUs, for example, operate with respect to logical ports rather than physical ports. Each logical port is described by some data structure discernable by the CPU. A CPU which owns a given logical port, is the only owner of such a data structure and is the only CPU that may modify its contents. A logical port can be thought of as a given CPU's view on a specific physical port. Each physical port will have as many logical ports as there are CPU's (i.e., control units). In one embodiment, each physical port within switch 200 contains two logical ports. It should be noted, however, that more or less logical and/or physical communication ports may be included within switch 200 without departing from the spirit and scope of the invention. In one embodiment, logical network interface 230 is implemented by way of an application specific integrated circuit (ASIC) coupled to control units 222 and 242. Switches, such as switch 200, run what is known as Spanning Tree protocol (STP) according to IEEE 802.1D (IEEE 802.1D standard 1998—available from the IEEE Standards Department, Copyright Information, 445 Hoes Lane, P.O. Box 1331, Piscataway, N.J. 08855-1331). STP eliminates network loops and packet duplication. In order to do so, STP disables some ports (i.e., introduces them into BLOCKING state) while others remain active (i.e., FORWARDING state). Since CPUs operate on logical ports, they assign FORWARDING and BLOCKING states to their logical ports. These states are stored in the logical port data structure available for the micro-code running on a specific physical port.

Figure 2B:
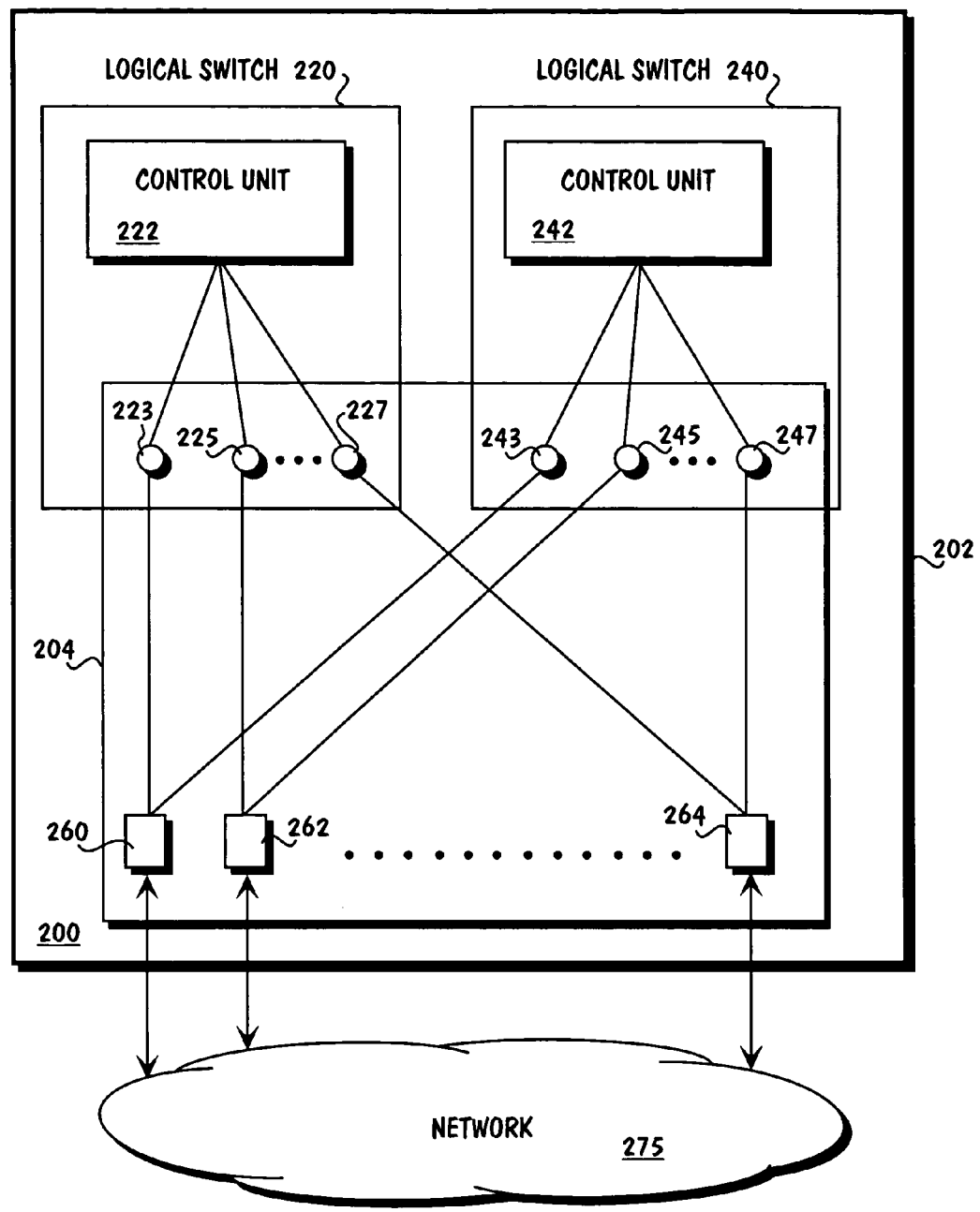
FIG. 2B is a block diagram illustrating a chassis-based switch according to a further embodiment of the invention.

FIG. 2B is a block diagram illustrating a chassis-based switch according to a further embodiment of the invention. As with FIG. 2A, FIG. 2B similarly depicts switch 200 including chassis 202, control units 222 and 242, logical communication ports 223, 225, 227, 243, 245 and 247, and physical communication ports 260, 262 and 264. Additionally, control unit 222 is shown grouped together with logical communication ports 223, 225, 227 to form logical switch 220. Likewise, control unit 242 is shown grouped together with logical communication ports 243, 245 and 247 to form logical switch 240. According to one embodiment of the invention, logical communication ports 223, 225, 227, 243, 245 and 247, and physical communication ports 260, 262 and 264 are embodied within ASIC 204. Accordingly, each of control units 222 and 242 addresses the ASIC as if it were addressing a physical port, when in actuality, it is addressing a logical port.

Figure 2C:
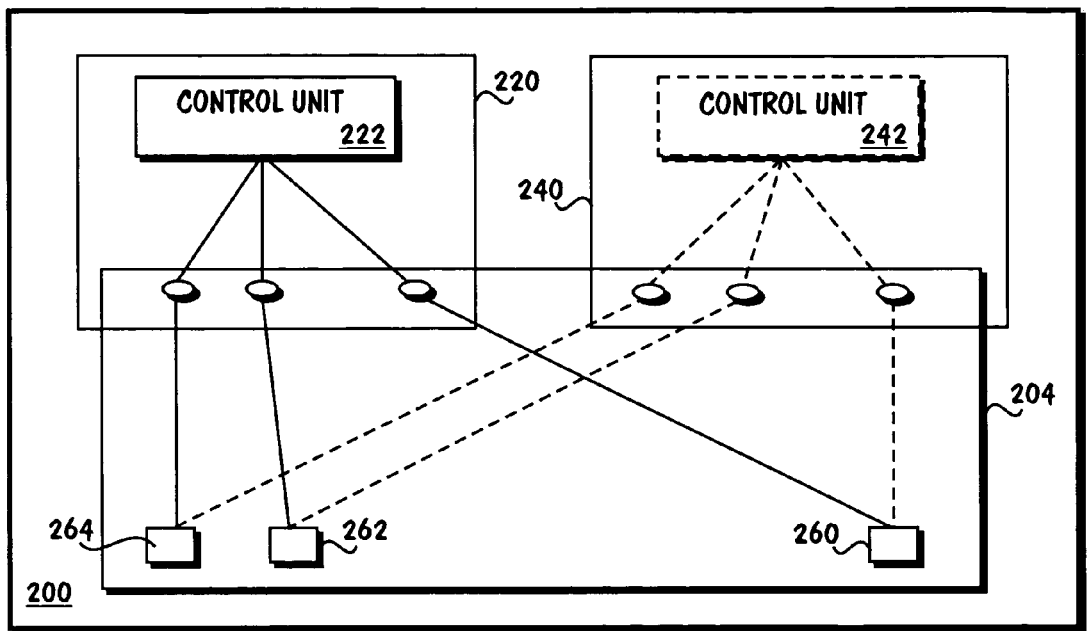
FIGS. 2C and 2D are block diagrams each illustrating the resilient aspects of the chassis-based switch depicted in FIGS. 2A and 2B.
Figure 2D:
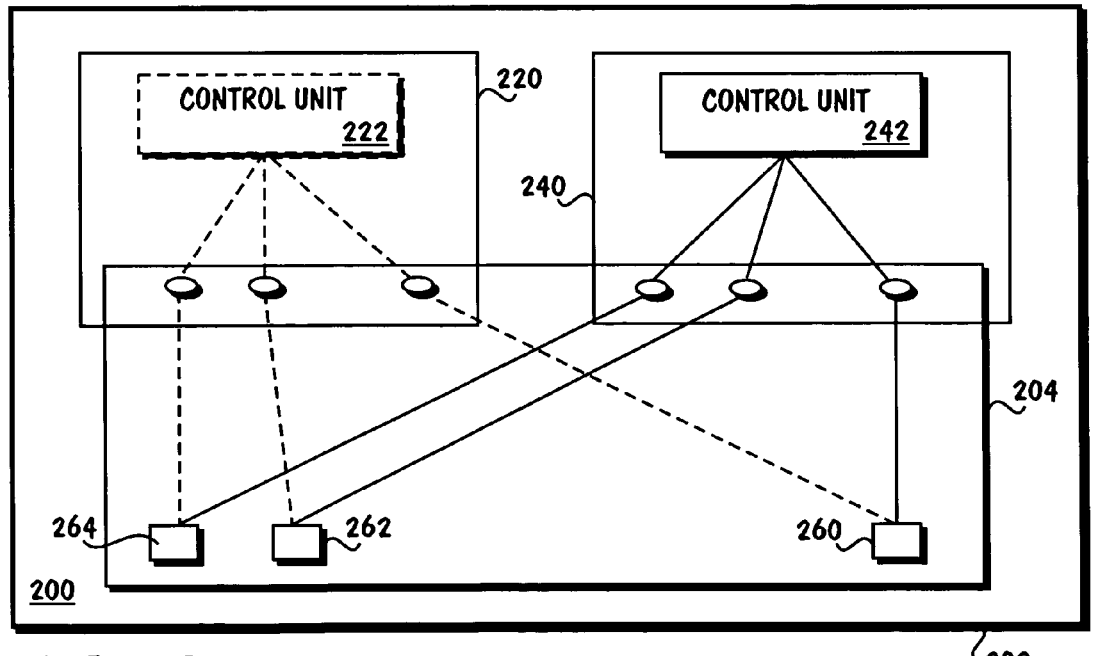

FIGS. 2C and 2D are block diagrams each illustrating the resilient aspects of the chassis-based switch depicted in FIGS. 2A and 2B. Referring to FIGS. 2C and 2D it should be readily apparent that even if one control unit were to fail, switch 200 would remain operational and continue to switch data between any of physical communication ports 260, 262 and 264. For example, if control unit 242 were to fail as is illustrated in FIG. 2C, the signal lines communicatively coupled between control unit 242 and physical communication ports 260, 262 and 264 would likewise fail. Nonetheless, if control unit 222 remained operational, data received through physical communication ports 260, 262 and 264 could continue to be switched and/or routed. Similarly, if control unit 222 were to fail and control unit 242 remained operational as is depicted in FIG. 2D, the signal lines communicatively coupled between control unit 222 and physical communication ports 260, 262 and 264 would fail, but data would continue to be switched via control unit 242.

A switch can be said to have a data ingress (outgoing) side and a data egress (incoming) side. On the ingress side, a packet enters the switch through one of the ports belonging to a port interface (PIF). The PIF makes a forwarding decision (according to forwarding tables configured by a CPU, for example), and selects an outgoing port for the considered packet. In general, the egress port may reside on any PIF. The ingress PIF divides the packet into cells and passes them through the switch fabric to the egress PIF on the outgoing port. This port reassembles the cells into the packet and transmits it to another network. Certain switch fabrics need to be properly configured in order to pass cells from one port to another. Such a configuration includes the arrangement of streams. A stream is a virtual circuit, which connects an ingress physical port (belonging to some PIF) with one or more egress ports (which may belong to other PIFs). Multiple PIFs are used in packet broadcasting. From a stream viewpoint, there is no difference between a physical port and a CPU port (i.e., connection between CPU or control unit and switch logic), they are both just considered endpoints of streams.

Figure 3:
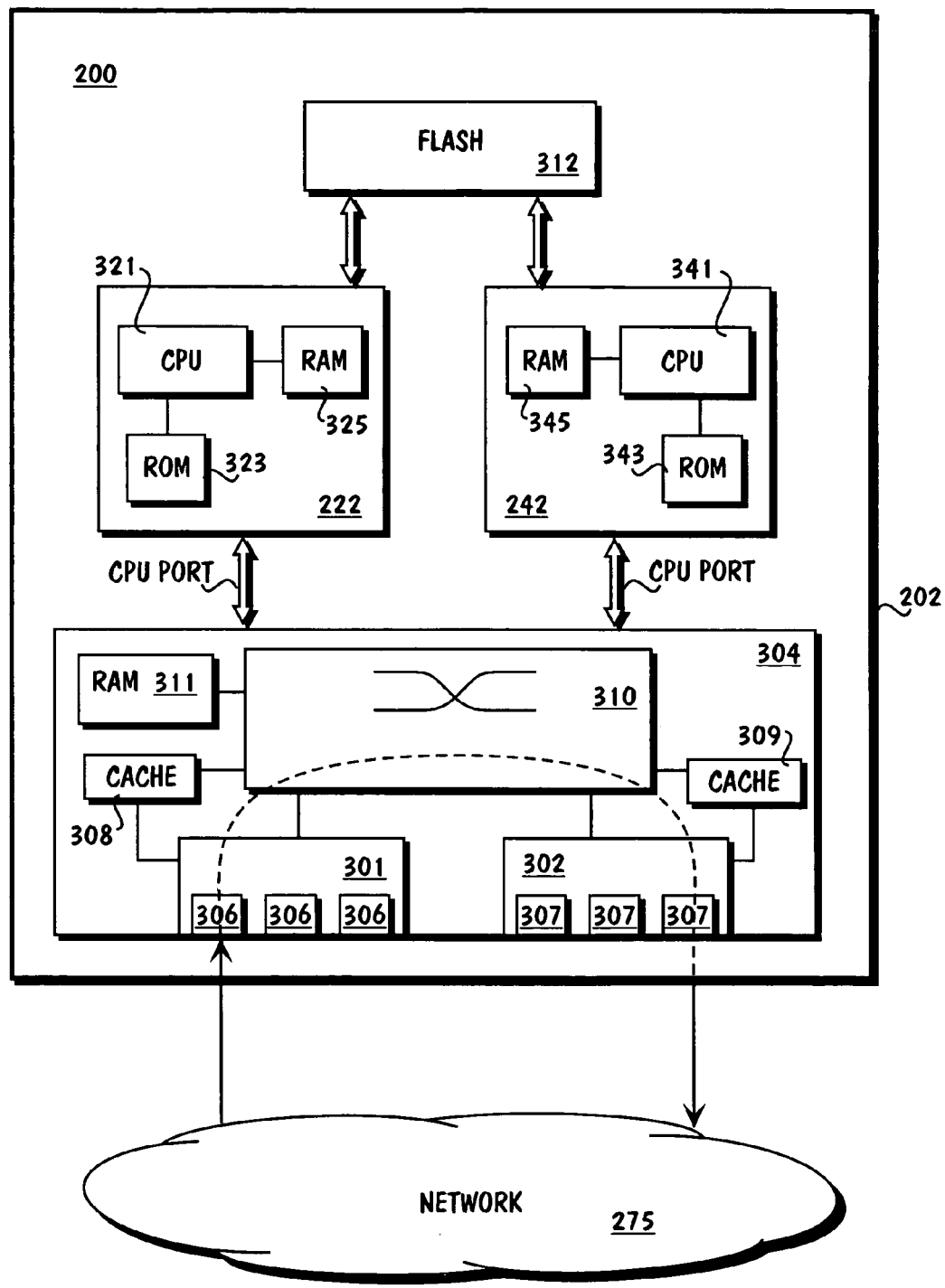
FIG. 3 is a hardware level diagram of a chassis-based switch according to one embodiment of the invention.

FIG. 3 is a hardware level diagram of switch 200 according to one embodiment of the invention. Switch 200 includes chassis 202, within which is secured control unit 222, control unit 242, FLASH memory 312 coupled to both control units 222 and 242, and switch logic 304 also coupled to both control units 222 and 242. Switch logic 304 includes switch fabric 310, port interfaces 301 and 302, physical communication ports 306 and 307 included within port interfaces 301 and 302, cache 308 and 309, and random access memory (RAM) 311.

According to one embodiment of the invention, upon receiving data through a physical communication port, such as physical communication port 306 for example, switch logic 304 extracts address information from the data and performs a lookup to determine if the identified address exists in cache 308 (or 309). If the address is located in the cache, switch fabric 310 may opt to switch the data to the appropriate physical communication port associated with the address information in the cache. If, however, the address is not found within either cache 308 or 309, switch fabric 310 may opt to pass the data to either of control units 222 or 242. In one embodiment, all broadcast and multicast transmissions received through physical communication ports 306 and/or 307 are forwarded to both control units 222 and 242. Similarly, broadcast and multicast transmissions originating from one of control units 222 and 242 are transmitted to physical communication ports 306 and/or 307 as well as to the remaining control unit(s). In one embodiment, switch logic 304 is implemented as a single ASIC, whereas in other embodiments, switch logic 304 may be implemented as multiple ASICs. In one embodiment switch logic 304 is an AnyFlow 5400 Network Processor available from MMC Networks of Sunnyvale, Calif.

Control unit 222 includes processor (CPU) 321, read only memory (ROM) 323, and RAM 325, whereas control unit 242 includes CPU 341, ROM 343, and RAM 345. Although both RAM and ROM devices are included within each of control units 222 and 242, one or more of the memory devices may be omitted or additional memory devices may be included. According to one embodiment of the invention, one or more network communication protocols and/or network management agents known in the art, are utilized by control unit 222 and/or control unit 242 to switch and/or route data. In one embodiment, at least one of ROM 323 and 343 stores a simple network management protocol (SNMP) agent for execution by CPU 321 and/or CPU 341. In other embodiments, various other network management agents known in the art may be utilized. In one embodiment, at least one of ROM 323 and 343 stores code that when executed by CPU 321 and/or CPU 341, implements the open shortest path first (OSPF) routing protocol known in the art. CPU 321 and/or CPU 341 may implement a variety of other routing protocols known in the art including, but not limited to border gateway protocol (BGP), exterior gateway protocol (EGP) and interior gateway protocol (IGP). In one embodiment, CPU 321 and CPU 341 each independently and contemporaneously execute a version of OSPF. In one embodiment, in order for each control unit to maintain accurate routing information, every broadcast or multicast transmission (including protocol advertisements) originating from one control unit is forwarded to switch logic 304 and all other control units present within switch 200.

The connection between CPU 321 and CPU 341 may be considered a logical connection whereby signaling between the CPUs occurs through switch logic 304 via data packets or frames. In one embodiment, CPU 321 and CPU 341 exchange "heartbeat" or "keep alive" messages that indicate that the sending CPU is operational. If a first CPU does not detect a heartbeat from a second CPU within a set amount of time, for example, the first CPU assumes that the second CPU has failed. If one CPU detects that the other CPU has failed, the operating CPU updates the level 2 and/or level 3 caches on all physical communication ports. CPU 321 and CPU 341 need not, however, communicate the heartbeat messages through data packets. If the CPUs are so equipped, one CPU may communicate its operational status to another CPU via an interrupt linked signal line or side-band connection between the CPUs. Because both CPUs maintain their own routing protocols such as OSPF, when one CPU fails, the remaining CPU does not have to take the time to start up and create routing tables from scratch as is required in prior art switching systems.

Flash 312 represents a programmable read only memory device to store configuration data for control units 222 and 242. In one embodiment, flash 312 is included as part of backplane circuitry within chassis 202. In an alternative embodiment, each of control units 322 and 342 may include their own flash device, however, additional synchronization measures may be necessary. In one embodiment, flash 312 stores network addresses for control units 222 and 242. In one embodiment, the network address to be assigned to one control unit is derived from the network address assigned to the other control unit.

Figure 4:
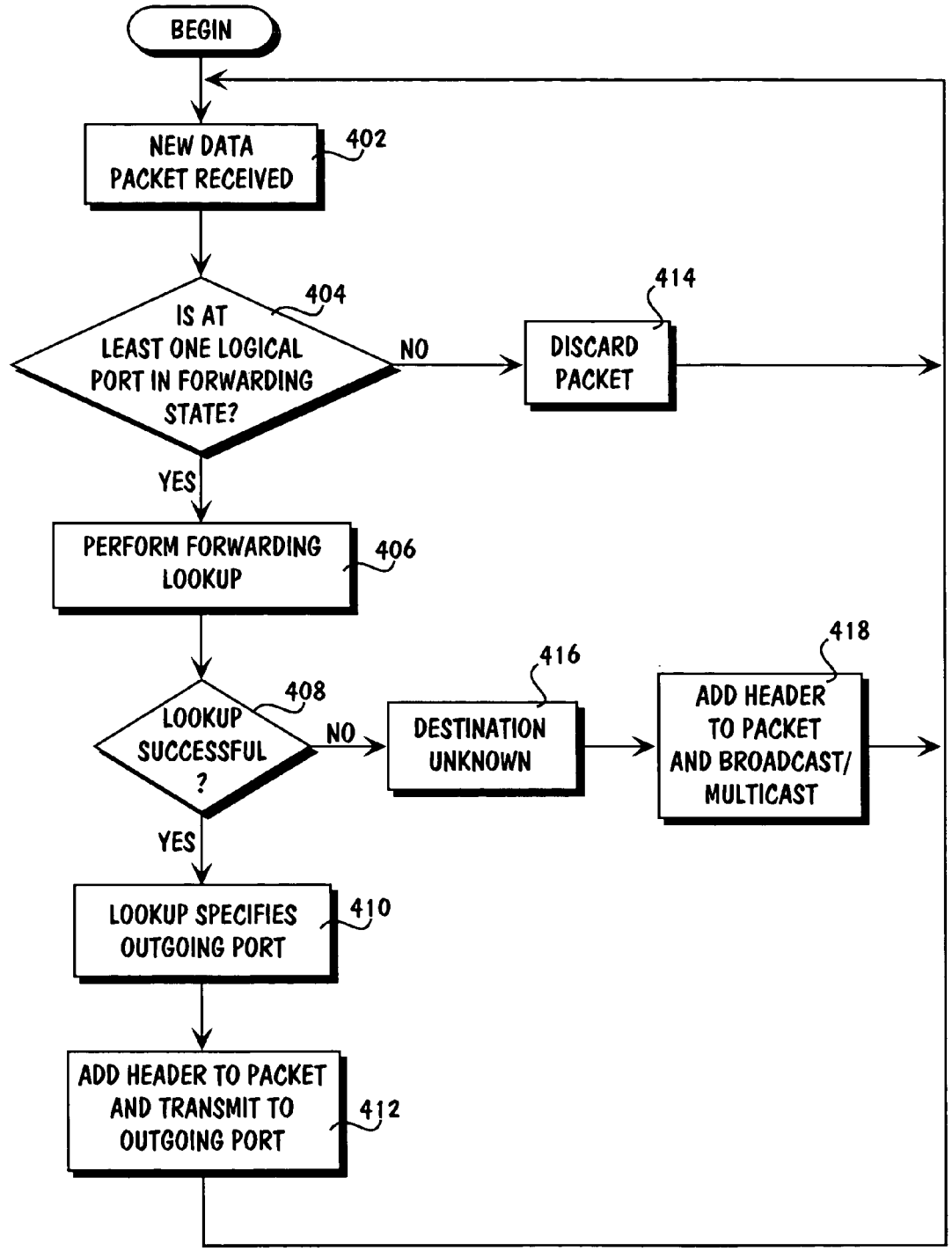
FIG. 4 is a block diagram illustrating a redundant switch architecture according to one embodiment of the invention.

Although the teachings of the present invention may be implemented in many manners, one such implementation involves the use of a dedicated network processor as the switching logic. It should be noted, however, that the methods discussed herein may be equally applicable to other implementations. FIG. 4 is a flow diagram illustrating one embodiment of egress processing on a physical port according to such a network processor-based implementation.

To start the process, a new data packet is first received by the switch at one of the physical ports (402). The receiving physical port determines whether or not at least one of the logical ports present on the receiving physical port is in the FORWARDING state (404). If not, the packet is discarded to avoid duplication and loops (414). If there is at least one logical port present on the receiving physical port in the FORWARDING state, however, a forwarding lookup is performed on the packet (406). If the lookup is successful (408), the lookup result will specify which port is outgoing and which point-to-point stream to use. If the lookup fails (408), however, the packet destination is not known (416) the unknown destination (as with broadcasts and multicasts) is flooded by being sent through a "broadcast-to-all" stream (418). Additionally, each time a packet is sent through the switching logic, a short header is added to the packet. In one embodiment, the header contains information as to which CPU logical port is in a FORWARDING state.

In one embodiment the header contains two flags which are set when appropriate logical ports are FORWARDING: INGRESS_CPU_1, and INGRESS_CPU_2. When a physical port receives a frame from the switch logic, the previously added header is inspected. In one embodiment, the frame is forwarded if the following condition is satisfied: (a) CPU1s logical port on the egress physical port is FORWARDING, and INGRESS_CPU_1 is set; or CPU2's logical port on the egress physical port is FORWARDING and INGRESS_CPU_2 is set. Otherwise, the packet is discarded to avoid duplication and loops.

In one embodiment, each time a CPU originates a unicast packet, it sets its flag (i.e., INGRESS_CPU_1) in the header. In the case when the CPU originates a broadcast or multicast frame, such as an ARP request for example), then it sets both INGRESS_CPU_1 and INGRESS_CPU_1 flags. In on embodiment, when a CPU receives a packet through the switch logic, it accepts that packet if the appropriate flag (i.e. INGRESS_CPU_1) is set.

Resilient chassis-based network switching has thus been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
    a first interface comprising a plurality of physical communication ports to transmit data to and receive data from a plurality of network devices;
    a first control unit communicatively coupled to the first interface to process at least a first subset of the data;
    a second control unit communicatively coupled to the first interface and the first control unit to process at least a second subset of the data, wherein the first and second control units further independently maintain network status information; and
    a logical network interface to provide multiple logical communication ports, the logical network interface communicatively coupled between the first interface and the first and second control units, wherein the logical network interface is communicatively coupled to each of the physical communication ports of the first interface by at least one signal line such that if a forwarding lookup for a packet is unsuccessful the packet is transmitted to multiple communication ports, and wherein the logical network interface enables each control unit to simultaneously manage each of the physical communication ports.

2. The apparatus of claim 1, wherein the logical network interface comprises two logical communication ports for each one of the plurality of physical communication ports.

3. The apparatus of claim 1, wherein each of the first and second control units further comprises:
    a memory device to store one or more data transmission protocols; and
    a processor coupled to the memory device to process network data based at least in part upon the one or more data transmission protocols.

4. The apparatus of claim 3, wherein the one or more data transmission protocols includes Open Shortest Path First (OSPF).

5. The apparatus of claim 3, further comprising:
    a non-volatile memory device coupled to the first and second control units to store configuration data for use by the first and second control units.

6. The apparatus of claim 5, wherein the apparatus comprises a chassis, and the non-volatile memory device is embodied within a first blade secured within the chassis and at least one of the first and second control units is embodied within a second blade secured within the chassis.

7. The apparatus of claim 1, wherein the first interface and the logical network interface are embodied within an Application Specific Integrated Circuit (ASIC).

8. The apparatus of claim 1, wherein the first control unit is associated with a first network address and the second control unit is associated with a second network address.

9. The apparatus of claim 1, wherein the network status information is maintained in a routing table.

10. A method comprising:
    representing a plurality of physical data communication ports as a corresponding plurality of logical data communications ports such that either one of a first control unit and a second control unit communicatively coupled to the physical data communication ports can communicate with any of a plurality of external devices communicatively coupled to the physical data communication ports if the other of the first and second control units fails, wherein the logical communications ports are provided by a logical network interface that enables each control unit to simultaneously manage each of the physical data communications ports;
    maintaining network status information independently by each of the control units;
    performing a lookup operation for a destination port corresponding to a received packet; and
    forwarding the packet to each of the physical data communication ports if the lookup operation is unsuccessful.

11. The method of claim 10, further comprising:
    maintaining by the first control unit, first address data corresponding to the plurality of external devices; and
    maintaining by the second control unit, second address data corresponding to the plurality of external devices.

12. The method of claim 11, wherein the first control unit maintains the first address data and the second control unit maintains the second address data each according to at least one of a plurality of routing protocols.

13. The method of claim 12, wherein the plurality of routing protocols include at least one of Open Shortest Path First protocol, Border Gateway Protocol, and Exterior Gateway Protocol.

14. The method of claim 10, wherein the first control unit may be identified by a first network address and the second control unit may be identified by a second network address.

15. The method of claim 14, wherein the second network address is derived from the first network address.

16. A storage medium having stored thereon a plurality of executable instructions, wherein when executed, operate to represent a plurality of physical data communication ports as a corresponding plurality of logical data communications ports such that either one of a first control unit and a second control unit, wherein each control unit independently maintains network status information, can communicate with any of a plurality of external devices communicatively coupled to both the first and second control units if the other of the first and second control units fails, wherein the logical data communications ports are provided by a logical network interface that enables each control unit to simultaneously manage each of the physical data communications ports, to perform a lookup operation for a destination port corresponding to a received packet, and to forward the packet to each of the physical data communication ports if the lookup operation is unsuccessful.

17. The storage medium of claim 16, further comprising instructions, wherein when executed, operate to:

maintain in association with the first control unit, first address data corresponding to the plurality of external devices; and maintain in association with the second control unit, second address data corresponding to the plurality of external devices.

18. The storage medium of claim 17, further comprising instructions, wherein when executed, operate to perform layer 2 and/or layer 3 switching.

* * * * *